United States Patent
Jin et al.

(10) Patent No.: US 12,284,544 B2
(45) Date of Patent: Apr. 22, 2025

(54) MEASUREMENT CONFIGURATION METHOD AND APPARATUS

(71) Applicant: Honor Device Co., Ltd., Shenzhen (CN)

(72) Inventors: Le Jin, Shenzhen (CN); Zhou Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 308 days.

(21) Appl. No.: 17/776,772

(22) PCT Filed: Mar. 16, 2021

(86) PCT No.: PCT/CN2021/081172
§ 371 (c)(1),
(2) Date: May 13, 2022

(87) PCT Pub. No.: WO2021/190364
PCT Pub. Date: Sep. 30, 2021

(65) Prior Publication Data
US 2022/0394533 A1    Dec. 8, 2022

(30) Foreign Application Priority Data
Mar. 25, 2020   (CN) .......................... 202010218679.7

(51) Int. Cl.
*H04W 24/10*       (2009.01)
*H04W 56/00*       (2009.01)

(52) U.S. Cl.
CPC ......... *H04W 24/10* (2013.01); *H04W 56/001* (2013.01)

(58) Field of Classification Search
CPC ........................... H04W 24/10; H04W 56/001
See application file for complete search history.

(56) References Cited

U.S. PATENT DOCUMENTS 10,779,182 B2 *  9/2020  Yiu ....................... H04W 24/10
11,398,874 B2    7/2022  Sukhyon et al.
(Continued)

FOREIGN PATENT DOCUMENTS

| CN | 110622584 A | 12/2019 |
|----|-------------|---------|
| CN | 110661600 A | 1/2020 |

(Continued)

OTHER PUBLICATIONS

Vivo., "Issues on measurement gap in EN-DC and NR", 3GPP TSG-RAN WG2 Meeting #100, R2-1712765, Nov. 27-Dec. 1, 2017, 8 Pages, Reno, USA.

(Continued)

*Primary Examiner* — Phuc H Tran
(74) *Attorney, Agent, or Firm* — Slater Matsil, LLP

(57) ABSTRACT

A measurement configuration method and an apparatus are provided. The method includes: a network device transmits measurement configuration information to a terminal device, where the measurement configuration information includes first information indicating that an MG is active when a frequency of an SSB that is indicated by an MO of a first serving cell of the terminal device is out of a currently active BWP of the first serving cell; and after the active BWP of the first serving cell of the terminal device is switched from a first BWP to a second BWP, the terminal device determines, based on the first information, that the MG in the measurement configuration is active, where the second BWP does not include the frequency of the SSB that is indicated by the MO corresponding to the first serving cell.

19 Claims, 6 Drawing Sheets

(56) References Cited

U.S. PATENT DOCUMENTS

| | | | |
|---|---|---|---|
| 2019/0044689 A1 | 2/2019 | Candy et al. | |
| 2019/0059093 A1 | 2/2019 | Yu-Hsin et al. | |
| 2019/0132824 A1 | 5/2019 | Hyoungsuk et al. | |
| 2019/0182000 A1* | 6/2019 | Futaki | H04W 72/0453 |
| 2019/0230550 A1* | 7/2019 | Yiu | H04W 24/10 |
| 2019/0274146 A1 | 9/2019 | Yang et al. | |
| 2021/0160798 A1 | 5/2021 | Lili et al. | |

FOREIGN PATENT DOCUMENTS

| | | |
|---|---|---|
| CN | 110798846 A | 2/2020 |
| CN | 110831042 A | 2/2020 |
| CN | 112399492 A | 2/2021 |
| WO | 2019107969 A1 | 6/2019 |

OTHER PUBLICATIONS

Ericsson, "Configuration of measurement gap in NR", 3GPP TSG-RAN WG2 #100, R2-1713737, Nov. 27-Dec. 1, 2017, 3 Pages, Reno, USA.

Samsung, "Discussion on NR serving cell measurement using gaps", 3GPP TSG-RAN WG2 #103 Meeting, R2-1811798, Aug. 20-24, 2018, 4 Pages, Gothenburg, Sweden.

Intel Corporation, "Motivation to introduce new SI of measurement gap enhancement", 3GPP TSG-RAN4 Meeting #89, R4-1814543, Nov. 12-16, 2018, 5 Pages, Spokane, Washington.

\* cited by examiner

MEASUREMENT CONFIGURATION METHOD AND APPARATUS

CROSS-REFERENCE TO RELATED APPLICATIONS

This application is a national stage of International Application No. PCT/CN2021/081172, filed on Mar. 16, 2021, which claims priority to Chinese Patent Application No. 202010218679.7, filed on Mar. 25, 2020. Both of them are hereby incorporated by reference in their entireties.

TECHNICAL FIELD

This application relates to the field of communications technologies, and in particular, to a measurement configuration method and an apparatus.

BACKGROUND

When a terminal device is in a radio resource control connected (RRC_CONNECTED) state, the terminal device needs to monitor signal quality of a serving cell through continuous measurement. If the signal quality of the serving cell is lower than a threshold, a network device configures neighboring cell measurement, so that the terminal device can switch to a neighboring cell with better signal quality in a timely manner to maintain service continuity. The network device transmits measurement configuration information to the terminal device through RRC reconfiguration signaling. The measurement configuration information may include a measurement object (MO), a reporting configuration (reportConfig), a measurement identity (measId), a quantity configuration, a measurement gap (MG), and the like. If a frequency of a synchronization signal/physical broadcast channel block (SS/PBCH block, SSB) has been configured in the MO corresponding to the serving cell of the terminal device, the terminal device measures the serving cell based on measurement of SSB at this frequency.

The fifth generation (5th generation, 5G) new radio (NR), bandwidth part (BWP) is introduced, with different BWPs having different bandwidth sizes and different frequency domain locations. The network device configures the terminal device to work on a given BWP which is referred to as an active BWP. Each serving cell can be configured with at most one initial BWP and four dedicated BWPs. Switching between BWPs is supported. In switching to a new BWP, which means that the terminal device needs to work on the new BWP, the SSB corresponding to the serving cell may be out of a bandwidth range of this new BWP. In this case, according to an NR protocol, an MG needs to be configured. In the MG, the terminal device adjusts its radio frequency path from the currently active BWP to a frequency at which the SSB is located, thereby completing measurement of the SSB.

Currently, in a BWP switching process, the network device dynamically indicates, through downlink control information (DCI), the terminal device to switch between BWPs. If the switch-to BWP does not include the frequency of the SSB that is configured in the MO corresponding to the serving cell, the network device needs to reconfigure an MG in the measurement configuration information through RRC signaling. In the foregoing method, the DCI is physical layer control signaling. With DCI to implement dynamic switching between BWPs, the switching is fast. However, because measurement configuration is carried by RRC signaling, the configuration is slow. As a result, mismatch will occur between the configuration and switching, resulting in a cell measurement failure.

SUMMARY

This application provides a measurement configuration method and an apparatus, to resolve a problem of measurement configuration mismatch in a dynamic BWP switching process in the prior art.

According to a first aspect, this application provides a measurement configuration method, where the method may include: A terminal device receives measurement configuration information from a network device, where the measurement configuration information includes first information, and the first information is used for indicating that an MG is active if a frequency of an SSB that is indicated by an MO of a first serving cell is out of a currently active BWP of the first serving cell; and after the active BWP of the first serving cell of the terminal device is switched from a first BWP to a second BWP, the terminal device determines, based on the first information, that the MG in the measurement configuration is active, where the second BWP does not include the frequency of the SSB that is indicated by the MO corresponding to the first serving cell, and the first serving cell is any one of at least one serving cell of the terminal device.

With the foregoing method, if the terminal device switches to a BWP that does not include a frequency of an SSB that is indicated by an MO corresponding to a to-be-measured serving cell, the MG in the measurement configuration information is activated accordingly, with no need of configuration through RRC signaling, so as to resolve a problem of measurement configuration mismatch in a dynamic BWP switching process and reduce RRC signaling.

In a possible design, after the active BWP of the first serving cell of the terminal device is switched from the first BWP to a third BWP, the terminal device may further determine, based on the first information, that the MG in the measurement configuration is inactive, where the third BWP includes the frequency of the SSB that is indicated by the MO corresponding to the first serving cell. In this way, the problem of measurement configuration mismatch in a dynamic BWP switching process can be resolved, and RRC signaling can be reduced.

In a possible design, the first information may be located in a first field in a gap configuration of the measurement configuration information. The first field may be a new field in the gap configuration.

In a possible design, if the network device has configured a plurality of serving cells for the terminal device, a same MG is active if a frequency of an SSB that is indicated by an MO corresponding to any one of the plurality of serving cells is out of a currently active BWP of the serving cell. In this way, one MG may be configured for a plurality of serving cells, thereby reducing signaling overheads.

In a possible design, the terminal device may further receive second information from the network device, where the second information is used for indicating a correspondence between BWPs and MOs of the first serving cell of the terminal device, the first serving cell is configured with a plurality of MOs, and any one of the MOs is configured with a frequency of one SSB; the terminal device determines, based on the correspondence between BWPs and MOs, a first MO corresponding to a fourth BWP, where the fourth BWP is the currently active BWP of the first serving cell of the terminal device, and the fourth BWP is different from the second BWP; and the terminal device performs measurement on the SSB based on a frequency of an SSB that is indicated by the first MO.

With the foregoing method, a plurality of MOs and an association relationship between MOs and BWPs are configured for one serving cell, so that in BWP switching, an MO associated with the currently active BWP is automatically activated, thereby avoiding the problem of measurement configuration mismatch in a BWP switching process and reducing RRC signaling.

In a possible design, the second information may be received through the measurement configuration information; or the second information may be received through serving cell configuration information. In this way, the second information can be flexibly configured.

In a possible design, if the second information is received through the measurement configuration information, the second information may be included in a configuration of each of the MOs in the measurement configuration information, and the correspondence between BWPs and MOs of the first serving cell that is indicated by the second information in a configuration of any one of the MOs is that the any one of the MOs corresponds to a BWP of the first serving cell. In this way, a BWP associated with each MO can be defined. If the second information is received through the serving cell configuration information, the serving cell configuration information may further include third information, and the third information is used for indicating identities of the plurality of MOs of the first serving cell. This facilitates association of the MOs with measurement reporting configurations for subsequent measurement of the first serving cell.

In a possible design, MOs corresponding to different BWPs of the first serving cell have a same identity, and one of the plurality of MOs of the first serving cell is active at one moment.

According to a second aspect, this application provides a measurement configuration method, where the method may include: After determining measurement configuration information, a network device transmits measurement configuration information to a terminal device, where the measurement configuration information includes first information, the first information is used for indicating that a measurement gap MG is active if a frequency of a synchronization signal/physical broadcast channel block SSB that is indicated by a measurement object MO of a first serving cell of the terminal device is out of a currently active bandwidth part BWP of the first serving cell, and the first serving cell is any one of at least one serving cell of the terminal device.

With the foregoing method, if the terminal device switches to a BWP that does not include a frequency of an SSB that is indicated by an MO corresponding to a to-be-measured serving cell, the MG in the measurement configuration information is activated accordingly, with no need of configuration through RRC signaling, so as to resolve a problem of measurement configuration mismatch in a dynamic BWP switching process and reduce RRC signaling.

In a possible design, the first information may be located in a first field in a gap configuration of the measurement configuration information. The first field may be a new field in the gap configuration.

In a possible design, if the network device has configured a plurality of serving cells for the terminal device, a same MG is active if a frequency of an SSB that is indicated by an MO corresponding to any one of the plurality of serving cells is out of a currently active BWP of the serving cell. In this way, one MG may be configured for a plurality of serving cells, thereby reducing signaling overheads.

In a possible design, the network device may further determine second information and transmit the second information to the terminal device, where the second information is used for indicating a correspondence between BWPs and MOs of the first serving cell of the terminal device, the first serving cell is configured with a plurality of MOs, and any one of the MOs is configured with a frequency of one SSB.

With the foregoing method, a plurality of MOs and an association relationship between MOs and BWPs are configured for one serving cell, so that in BWP switching, an MO associated with the currently active BWP is automatically activated, thereby avoiding the problem of measurement configuration mismatch in a BWP switching process and reducing RRC signaling.

In a possible design, the second information may be transmitted through the measurement configuration information; or the second information may be transmitted through serving cell configuration information. In this way, the second information can be flexibly configured.

In a possible design, if the second information is transmitted through the measurement configuration information, the second information may be included in a configuration of each of the MOs in the measurement configuration information, and the correspondence between BWPs and MOs of the first serving cell that is indicated by the second information in a configuration of any one of the MOs is that the any one of the MOs corresponds to a BWP of the first serving cell. In this way, a BWP associated with each MO can be defined. If the second information is transmitted through the serving cell configuration information, the serving cell configuration information may further include third information, and the third information is used for indicating identities of the plurality of MOs of the first serving cell. This facilitates association of the MOs with measurement reporting configurations for subsequent measurement of the first serving cell.

In a possible design, MOs corresponding to different BWPs of the first serving cell have a same identity, and one of the plurality of MOs of the first serving cell is active at one moment.

According to a third aspect, this application further provides a terminal device, where the terminal device has the functions of the terminal device in the first aspect or the possible design examples of the first aspect. The functions may be implemented by hardware, or may be implemented by hardware executing corresponding software. The hardware or the software includes one or more modules corresponding to the functions.

In a possible design, a structure of the terminal device includes a transceiver unit and a processing unit. These units may perform the corresponding functions of the terminal device in the first aspect or the possible design examples of the first aspect. For details, refer to detailed descriptions in the method example which are not repeated herein.

In a possible design, the structure of the terminal device includes a transceiver and a processor, and optionally further includes a memory. The transceiver is configured to receive and transmit data, and configured to communicate and interact with another device in a communications system. The processor is configured to support the terminal device in performing corresponding functions of the terminal device in the first aspect or the possible design examples of the first aspect. The memory is coupled to the processor, and stores program instructions and data that are necessary for the terminal device.

According to a fourth aspect, this application further provides a network device, where the network device has the functions of implementing the network device in the second aspect or the possible design examples of the second aspect. The functions may be implemented by hardware, or may be implemented by hardware executing corresponding software. The hardware or the software includes one or more modules corresponding to the functions.

In a possible design, a structure of the network device includes a transceiver unit and a processing unit. These units may perform the corresponding functions of the network device in the second aspect or the possible design examples of the second aspect. For details, refer to detailed descriptions in the method example which are not repeated herein.

In a possible design, the structure of the network device includes a transceiver and a processor, and optionally further includes a memory. The transceiver is configured to receive and transmit data, and configured to communicate and interact with another device in a communications system. The processor is configured to support the network device in performing corresponding functions of the network device in the second aspect or the possible design examples of the second aspect. The memory is coupled to the processor, and stores program instructions and data that are necessary for the network device.

According to a fifth aspect, an embodiment of this application provides a communications system, where the communications system may include the foregoing terminal device and network device, and the like.

According to a sixth aspect, an embodiment of this application provides a computer readable storage medium, where the computer readable storage medium stores program instructions, and when the program instructions are run on a computer, the computer is caused to execute the method according to the first aspect or any one of the possible designs of the first aspect or the method according to the second aspect or any one of the possible designs of the second aspect. For example, the computer readable storage medium may be any usable medium accessible by a computer. For examples without limitation, the computer readable storage medium may include a non-transitory computer readable medium, a random access memory (RAM), a read-only memory (ROM), an electrically erasable programmable read only memory (electrically EPROM, EEPROM), a CD-ROM or other compact disc storage devices, a disk storage medium or other magnetic storage devices, or any other computer accessible medium that can be used to carry or store expected program code in a form of instructions or data structures.

According to a seventh aspect, an embodiment of this application provides a computer program product including computer program code or instructions, where when the computer program product is run on a computer, the computer is caused to execute the method in any one of the possible designs in the first aspect or the second aspect.

According to an eighth aspect, this application further provides a chip, where the chip is coupled to a memory and configured to read and execute program instructions stored in the memory, so as to implement the method according to any one of the possible designs of the first aspect or the second aspect.

For the third aspect to the sixth aspect and the possible technical effects achievable by these aspects, refer to the descriptions of the technical effects that can be achieved by the possible solutions in the first aspect or the second aspect. Details are not repeated herein.

DETAILED DESCRIPTION OF THE EMBODIMENTS

The following further describes in detail this application with reference to accompanying drawings.

Embodiments of this application provide a measurement configuration method and an apparatus, to resolve a problem of measurement configuration mismatch in a dynamic BWP switching process in the prior art. The method and the apparatus provided in this application are based on a same inventive concept. Because principles of the method and the apparatus for resolving a problem are similar, mutual reference may be made between implementation of the apparatus and implementation of the method, and repeated descriptions are omitted.

Figure 1:
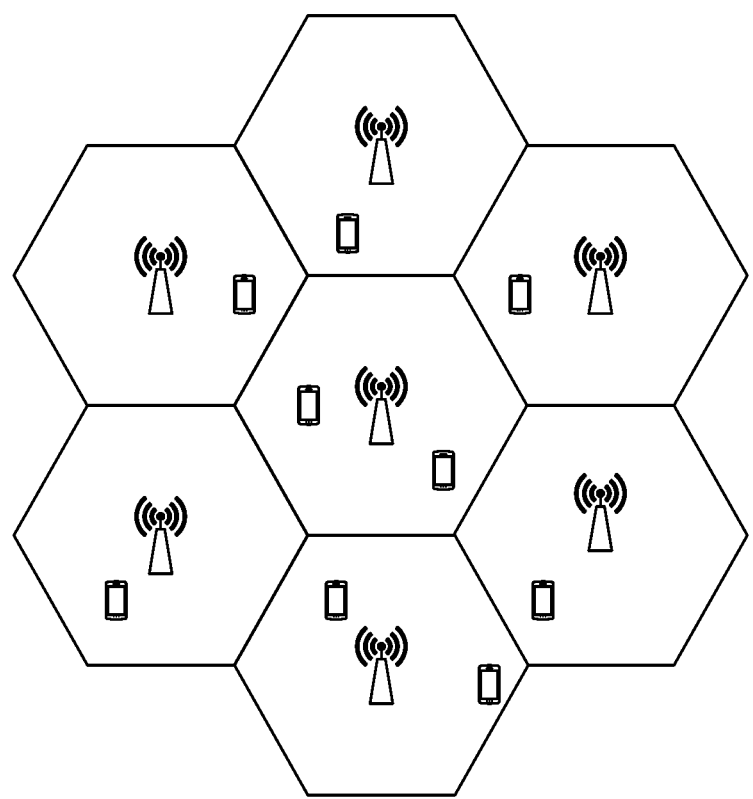
FIG. 1 is a schematic diagram of an architecture of a communications system according to this application.

FIG. 1 shows an architecture of a possible communications system to which the measurement configuration method provided in the embodiments of this application is applicable. In the communications system, a radio access network is divided into cells, terminal devices in each cell are linked to a network device of the cell through an air interface, and signaling and data exchange are performed on the air interface. The radio access network may be based on a plurality of access technologies, specifically depending on a network standard used. For example, in 5th generation (5th generation, 5G) new radio (NR), a network device may use an multiple access mode named orthogonal frequency division multiple access (OFDMA).

When the terminal device is in a radio resource control connected (RRC_CONNECTED) state, the network device configures measurement configuration information for the terminal device through RRC signaling, and the terminal device measures signal quality of a serving cell according to the configured measurement configuration information. If the measured signal quality of the serving cell is lower than a threshold, the network device configures neighboring cell measurement, so that the terminal device can switch to a neighboring cell with better signal quality in a timely manner.

Specifically, the network device may be a radio access network (RAN) device, the radio access network device may also be referred to as a base station, and the base station may include but is not limited to: a next generation node B (gNB), a radio network controller (RNC), a node B (NB), a base station controller (BSC), a base transceiver station (BTS), a home base station (for example, home evolved NodeB, or home Node B, HNB), or a baseband unit (BBU); or an access point (AP), a wireless relay node, a wireless backhaul node, a transmission and reception point or transmission point (TRP, or TP), and the like in a wireless fidelity (WIFI) system; or may be a network node that constitutes a gNB or a transmission point, such as a baseband unit (BBU) or a distributed unit (DU).

The terminal device may also be referred to as user equipment (UE), an access terminal, a subscriber unit, a subscriber station, a mobile station, a mobile, a remote station, a remote terminal, a mobile device, a user terminal, a terminal, a wireless communications device, a user agent, or a user apparatus. The terminal device in the embodiments of this application may be a mobile phone, a tablet computer (Pad), a computer having wireless transmitting and receiving functions, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, and the like. Application scenarios are not limited in the embodiments of this application. In this application, a terminal device with wireless receiving and transmitting functions and a chip that can be installed in the terminal device are collectively referred to as a terminal device.

Figure 2:
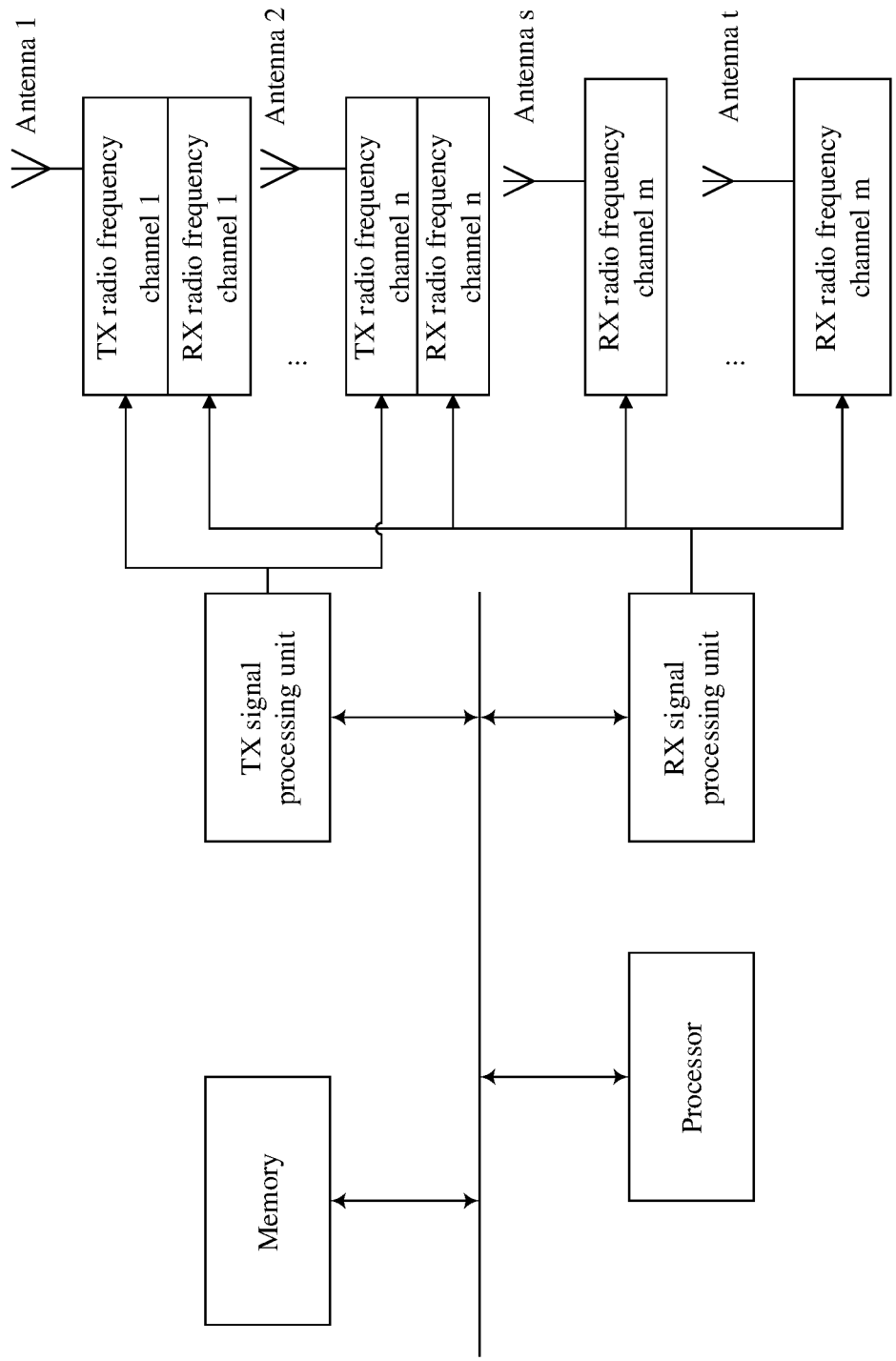
FIG. 2 is a schematic structural diagram of a terminal device according to this application.

FIG. 2 is a schematic structural diagram of a terminal device. The terminal device is applicable to the communications system shown in FIG. 1. For ease of description, FIG. 2 shows only main components of the terminal device. As shown in FIG. 2, the terminal device may include a processor, a memory, a transmit (TX) signal processing unit, a receive (RX) signal processing unit, a TX radio frequency channel, an RX radio frequency channel, and an antenna.

The memory includes a static memory for storing executable code and data, and also includes a dynamic memory for storing instructions and dynamic data. The processor is configured to control the TX signal processing unit and the RX signal processing unit to transmit and receive a signal in a predefined manner. The TX signal processing unit implements various signal processing functions for signal transmission, including channel coding, scrambling, modulation, layer mapping, precoding, antenna mapping, and the like. The RX signal processing unit implements various signal processing functions for signal reception, including synchronization, time-frequency tracking, measurement, channel estimation, equalization, demodulation, de-scrambling, and decoding.

The TX signal processing unit and the RX signal processing unit are connected to the antenna through the TX radio frequency channel and the RX radio frequency channel respectively. The TX radio frequency channel modulates a baseband signal to a carrier frequency and transmits the modulated signal through the antenna; and the RX radio frequency channel demodulates a radio frequency signal received from the antenna into a baseband signal, and transmits the baseband signal to the RX signal processing unit for processing. In this application, the RX signal processing unit is mainly configured to process a received signal SSB and calculate signal quality of a serving cell, including at least one of a reference signal received power (RSRP), reference signal received quality (RSRQ) and a signal-to-noise ratio (SNR). Some antennas may be configured for both transmission and reception, and therefore are connected to both the TX radio frequency channel and the RX radio frequency channel; and some antennas are configured for reception only, and therefore are only connected to the radio frequency channel. In addition, the TX radio frequency channel and the RX radio frequency channel may be connected to any antenna, for example, a TX radio frequency channel 1 and an RX radio frequency channel 1 are connected to an antenna 2, allowing flexible configuration according to service requirements.

The TX signal processing unit and the RX signal processing unit may be collectively referred to as a transceiver; or the TX signal processing unit, the TX radio frequency channel, the RX signal processing unit, and the RX radio frequency channel may be collectively referred to as a transceiver; or the TX signal processing unit, the TX radio frequency channel, the RX signal processing unit, the RX radio frequency channel, and antenna may be collectively referred to as a transceiver. This is not limited in this application.

It should be noted that the communications system shown in FIG. 1 may be but is not limited to 5G systems such as NR. Optionally, the method in the embodiments of this application is also applicable to various future communications systems, such as 6G systems or other communications networks.

Currently, the measurement configuration information configured by the network device for the terminal device may include: an MO, a reporting configuration, a measurement identity, a quantity configuration, and an MG. Information such as a frequency that the terminal device needs to measure is configured in the MO, and each MO has one measurement object identity (MeasObjectId). For example, cell measurement in NR may be based on SSB measurement, and a frequency and subcarrier spacing of an SSB may be configured in the MO. The reporting configuration configures information such as a criterion for measurement result reporting, a reporting format and a reference signal type on which the measurement is based, each reporting configuration having a reporting configuration identity (reportConfigId). As to the measurement identity, each measurement identity associates one measurement object with one report configuration through MeasObjectId and reportConfigId. The quantity configuration configures a filter coefficient for measurement values. As to the MG, if measurement and data transmission cannot be performed simultaneously, the network device needs to configure an MG for the terminal device, that is, if the terminal device requires a measurement gap for measurement, the network device needs to configure the MG for the terminal device.

An NR protocol stipulates that each serving cell must be configured with one MO. In configuration information for a serving cell, a serving cell measurement object (servingCellMO) information element indicates a MeasObjectId, which is an ID of an MO corresponding to each serving cell. If a frequency of an SSB is configured in the MO, the serving cell is measured based on the SSB at the frequency.

BWP is introduced to NR, that is, a total uplink/downlink bandwidth of the cell is configured as a plurality of consecutive parts in frequency domain, which are referred to as uplink/downlink BWPs. Different BWPs have different bandwidth sizes and different frequency domain locations. The network device configures the terminal device to work on a given BWP which is referred to as an active BWP. The terminal device only needs to receive downlink data on an active downlink BWP, and transmit uplink data on an active uplink BWP. Each serving cell can be configured with at most one initial BWP and four dedicated BWPs. Each BWP has a unique ID for identifying the BWP (hereinafter referred to as bwp-Id). A bwp-Id of an initial BWP is fixed to 0, and a bwp-Id of a dedicated BWP ranges from 1 to 4. Switching between BWPs is supported. In switching to a new BWP, which means that the terminal device needs to work on the new BWP, the SSB corresponding to the serving cell may be out of a bandwidth range of this new BWP. In this case, according to an NR protocol, an MG needs to be configured. In the MG, the terminal device adjusts its radio frequency path from the currently active BWP to a frequency at which the SSB is located, thereby completing measurement of the SSB.

Currently, in a BWP switching process, the network device dynamically indicates, through DCI, the terminal device to switch between BWPs. If the switch-to BWP does not include the frequency of the SSB that is configured in the MO corresponding to the serving cell, the network device needs to reconfigure an MG in measurement configuration information through RRC signaling. DCI is physical layer control signaling. With DCI to implement dynamic switching between BWPs, the switching is fast. However, because measurement configuration is carried by RRC signaling, the configuration is slow. As a result, mismatch will occur between the configuration and switching, resulting in a cell measurement failure. In addition, if the network device frequently indicates switching between a BWP including the frequency of the SSB and a BWP not including the frequency of the SSB, the network device needs to continuously configure and release MGs, causing an RRC signaling storm.

Based on the foregoing descriptions, an embodiment of this application provides a measurement configuration method, which may be applicable to the communications system shown in FIG. 1. If the terminal device switches to a BWP that does not include a frequency of an SSB that is indicated by an MO corresponding to a to-be-measured serving cell, the MG in the measurement configuration information is activated accordingly, with no need of configuration through RRC signaling, so as to resolve a problem of measurement configuration mismatch in a dynamic BWP switching process and reduce RRC signaling.

It should be noted that words such as "first", "second", and the like in the descriptions of this application are used merely for distinguishing in descriptions, and shall not be understood as an indication or implication of relative importance, and shall not be understood as an indication or implication of a sequence. In the descriptions in this application, "at least one" means one or more, and a plurality means two or more.

To describe the technical solutions of the embodiments of this application more clearly, the following describes in detail the communication method and the apparatus provided in the embodiments of this application with reference to the accompanying drawings.

Figure 3:
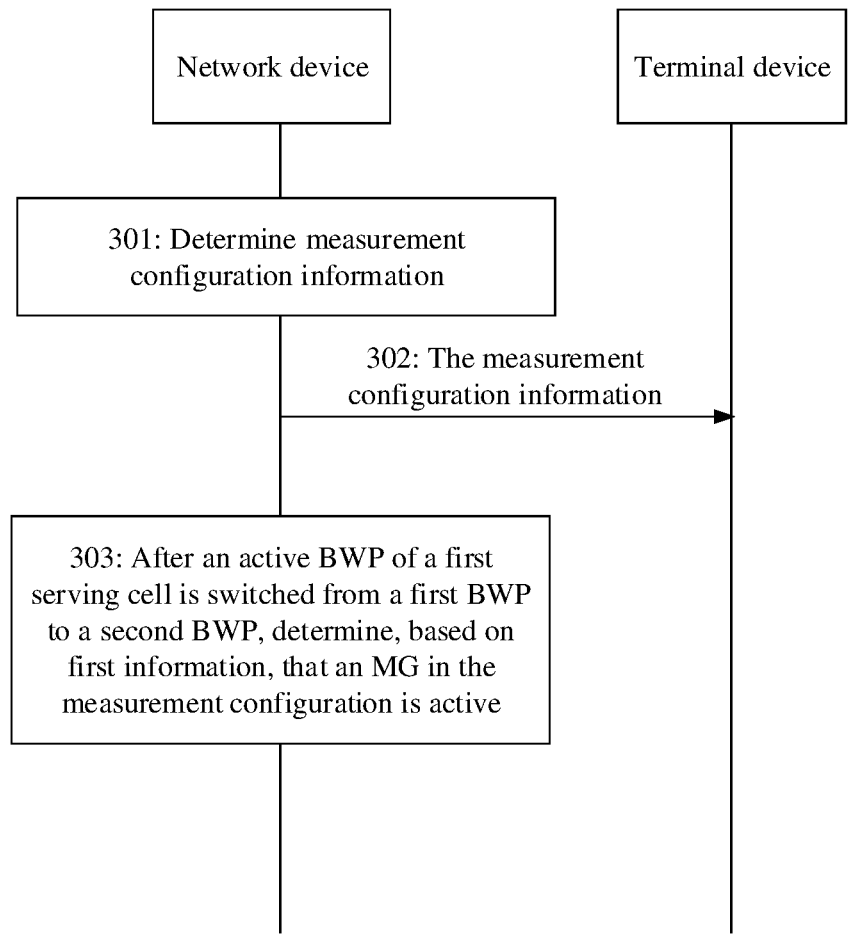
FIG. 3 is a flowchart of a measurement configuration method according to this application.

Referring to FIG. 3, a specific process of the measurement configuration method provided in the embodiments of this application may include the following steps.

Step 301: A network device determines measurement configuration information, where the measurement configuration information includes first information, the first information is used for indicating that an MG is active if a frequency of an SSB that is indicated by an MO of a first serving cell of a terminal device is out of a currently active BWP of the first serving cell, and the first serving cell is any one of at least one serving cell of the terminal device.

Step 302: The network device transmits the measurement configuration information to the terminal device.

Step 303: The terminal device receives the measurement configuration information, and after the active BWP of the first serving cell is switched from a first BWP to a second BWP, the terminal device determines, based on the first information, that the MG in the measurement configuration is active, where the second BWP does not include a frequency of the SSB that is indicated by the MO corresponding to the first serving cell.

Specifically, the first information may be located in a first field in a gap configuration (GapConfig) of the measurement configuration information. Optionally, the first field may be a new information element in GapConfig, and may indicate whether the MG is active dynamically with BWP switching.

In an optional example, a specific configuration of GapConfig including the first information may be as follows:

```
GapConfig ::= SEQUENCE {
gapOffset           INTEGER (0..159),
mgl                 ENUMERATED {ms1dot5, ms3,
ms3dot5, ms4, ms5dot5, ms6},
...,
activeDynamically ENUMERATED {true}              OPTIONAL
}.
```

The field activeDynamically in the foregoing configuration is the first field. If the field activeDynamically is set to be true (true), it means that the MG is active if a frequency of an SSB that is indicated by any MO is out of a currently active BWP of a corresponding serving cell. To be specific, the first information is used for indicating that the MG is active if the frequency of the SSB that is indicated by the MO of the first serving cell of the terminal device is out of the currently active BWP of the first serving cell.

Specifically, the MG is inactive only if currently active BWPs of all serving cells include respective frequencies of SSBs that are indicated by MOs corresponding to the serving cells. In an optional embodiment, after the active BWP of the first serving cell of the terminal device is switched from the first BWP to a third BWP, the terminal device determines, based on the first information, that the MG in the measurement configuration is inactive, where the third BWP includes the frequency of the SSB that is indicated by the MO corresponding to the first serving cell. In this case, if there are a plurality of serving cells, currently active BWPs of other serving cells than the first serving cell all include respective frequencies of SSBs that are indicated by MOs corresponding to the other serving cells.

Figure 4:
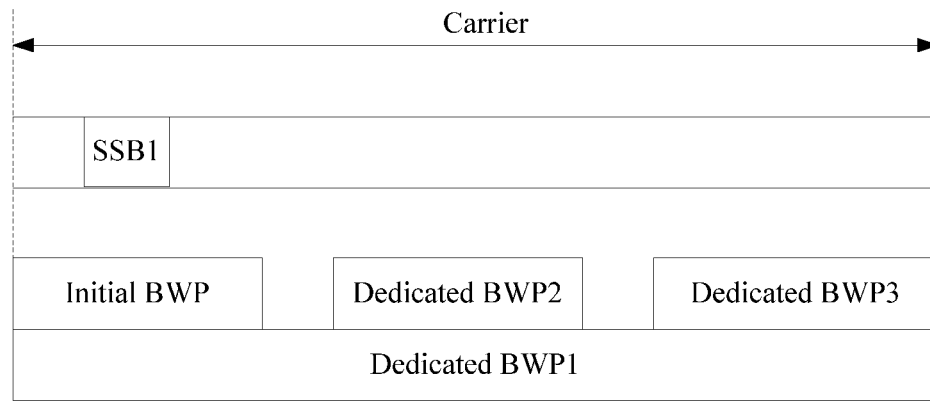
FIG. 4 is a schematic diagram of an SSB and BWP configuration according to this application.

In an example, if the network device configures only one serving cell (that is, the first serving cell) for the terminal device, the SSB indicated by the MO of the first serving cell and the BWP of the first serving cell may be configured as shown in FIG. 4. The network device configures a frequency of SSB1 that is indicated by the MO corresponding to the first serving cell, and configures the field activeDynamically in GapConfig to true. If the currently active BWP of the first serving cell is an initial BWP or a dedicated BWP1, the MG is inactive, and the network device does not allocate a measurement gap (gap) to the terminal device in this case; and if the currently active BWP of the first serving cell is dedicated BWP2 or dedicated BWP3, the MG is active, and the network device allocates a measurement gap according to a configuration in GapConfig in this case. In the measurement gap, the network device does not perform uplink or downlink scheduling, and the terminal device adjusts a radio frequency channel to a frequency at which SSB1 is located to receive a signal of SSB1, thereby completing measurement of SSB1.

In another example, if the network device has configured a plurality of serving cells for the terminal device, the network device may configure a corresponding MO for each serving cell, and also configure the field activeDynamically in GapConfig to true. In this way, if a frequency of an SSB that is indicated by an MO associated with any serving cell is out of the currently active BWP, the MG is active; otherwise, the MG is inactive. Further, if the network device has configured a plurality of serving cells for the terminal device, a same MG is active if a frequency of an SSB that is indicated by an MO corresponding to any one of the plurality of serving cells is out of a currently active BWP of the serving cell.

It should be noted that the field activeDynamically may not be included in GapConfig, that is, like the prior art, the MG in the measurement configuration is always active. Therefore, if the measurement configuration information does not include the first information, the MG is always active.

It should be noted that if the network device also configures inter-frequency or inter-system measurement, according to a current protocol, the network device must configure an MG, and therefore the field activeDynamically is not included in GapConfig.

In an embodiment, an NR protocol supports configuring a plurality of SSBs for measurement within one carrier bandwidth. In this scenario, in an optional embodiment, the terminal device may further receive second information from the network device, where the second information is used for indicating a correspondence between BWPs and MOs of the first serving cell of the terminal device, the first serving cell is configured with a plurality of MOs, and any one of the MOs is configured with a frequency of one SSB; the terminal device further determines, based on the correspondence between BWPs and MOs, a first MO corresponding to a fourth BWP, where the fourth BWP is the currently active BWP of the first serving cell of the terminal device, and the fourth BWP is different from the second BWP; and the terminal device performs measurement on the SSB based on a frequency of an SSB that is indicated by the first MO.

In an optional embodiment, the second information may be received through the measurement configuration information. For example, the second information may be included in a configuration of each of the MOs in the measurement configuration information, and the correspondence between BWPs and MOs of the first serving cell that is indicated by the second information in a configuration of any one of the MOs may be that the any one of the MOs corresponds to a BWP of the first serving cell. Specifically, a new information element BWP identity list (bwp-IdList) (that is, the second information) is added to the MO, indicating which BWPs are associated with the MO. In an example, the specific configuration of the MO may be as follows:

```
MeasObjectNR ::= SEQUENCE {
ssbFrequency              ARFCN-ValueNR              OPTIONAL, -- Cond
SSBorAssociatedSSB
ssbSubcarrierSpacingSubcarrierSpacing                OPTIONAL, -- Cond
SSBorAssociatedSSB
  smtc1                   SSB-MTC OPTIONAL,          -- Cond SSBorAssociatedSSB
  smtc2                   SSB-MTC2 OPTIONAL,         -- Cond IntraFreqConnected
refFreqCSI-RSARFCN-ValueNR                           OPTIONAL, -- Cond CSI-RS
......,
bwp-IdList                SEQUENCE (SIZE (1..
maxNrofBWPs)) OF BWP-Id OPTIONAL
}.
```

The configuration of the MO includes bwp-IdList, meaning that the MO is a dynamically active MO, which is dynamically activated with activation of a BWP indicated in bwp-IdList. In other words, the terminal device performs measurement on the SSB based on the frequency of the SSB that is indicated by the MO corresponding to the currently active BWP.

In a specific embodiment, if the configuration of the MO does not include bwp-IdList, it means that the MO is semi-static and always active once configured until the MO is deleted, for example, an MO configured for inter-frequency or inter-system measurement.

In an optional embodiment, MOs corresponding to different BWPs of the first serving cell have a same identity, and one of the plurality of MOs of the first serving cell is active at one moment. That is, dynamically active MOs configured for one serving cell may use one identity (MeasObjectId), and this MeasObjectID is consistent with an identity of an MO in a configuration of the serving cell (servingCellMO). Only one of the MOs that use one common MeasObjectId can be active at one moment. If a dynamically active MO and a non-dynamically active MO (that is, an MO not including the foregoing bwp-IdList) are configured with SSBs of a same frequency, only the non-dynamically active MO is active.

Figure 5:
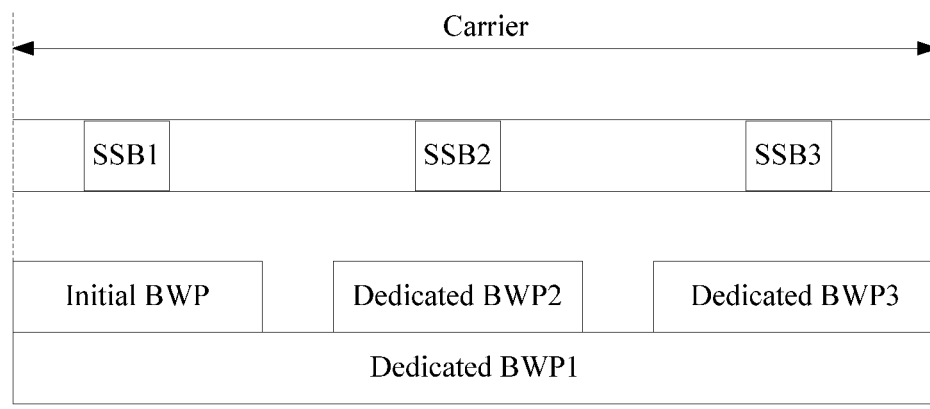
FIG. 5 is a schematic diagram of another SSB and BWP configuration according to this application.

For example, in the schematic diagram of BWPs and SSBs of a serving cell shown in FIG. 5, it is assumed that the terminal device has only one serving cell (that is, the first serving cell), with a triple {MeasObjectId, frequency of SSB, bwp-IdList} representing a configuration of each MO, the MO may be configured as: {MeasObjectId=1, SSB1, [BWP0, BWP1]}, {MeasObjectId=1, SSB2, BWP2} and {MeasObjectId=1, SSB3, BWP3}. To be specific, an MO including a frequency of SSB1 corresponds to BWP0 and BWP1, an MO including a frequency of SSB2 corresponds to BWP2, and an MO including a frequency of SSB3 corresponds to BWP3. In this case, each BWP has a frequency of an SSB.

Certainly, the network device may alternatively configure that no SSB frequency exists on some BWPs. For example, in the schematic diagram of BWPs and SSBs of a serving cell shown in FIG. 6, dedicated BWP3 is not configured with a frequency of an SSB. If the dedicated BWP3 is active, an MG needs to be configured for measurement of SSB1 or SSB2. In this case, a dynamically active MG may be configured in the same way as the first information is configured. For example, for FIG. 6, if there is only one serving cell, a measurement configuration may be: {MeasObjectId=1, SSB1, [BWP0 BWP1]}, {MeasObjectId=1, SSB2, BWP2}, and {MeasObjectId=1, SSB2, BWP3}; and activeDynamically=true in gapConfig. To be specific, an MO including a frequency of SSB1 corresponds to BWP0 and BWP1, and an MO including a frequency of SSB2 corresponds to BWP2; and if BWP3 is active, the MG is active through activeDynamically=true, and SSB2 measurement is configured.

Figure 6:
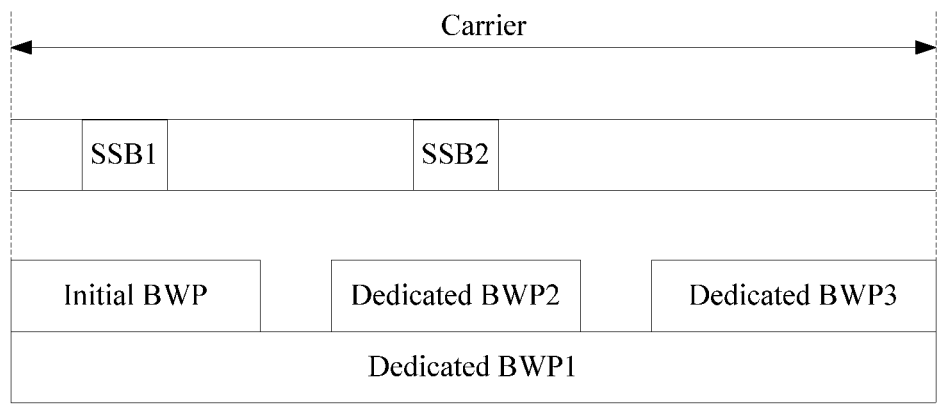
FIG. 6 is a schematic diagram of another SSB and BWP configuration according to this application.

In an example, in the case shown in FIG. 6, if the terminal device has only one serving cell and the network device has also configured inter-frequency neighboring cell measurement, a measurement configuration may be as follows: {MeasObjectId=1, SSB1, [BWP0 BWP1]}, {MeasObjectId=1, SSB2, BWP2}, {MeasObjectId=1, SSB2, BWP3}, and {MeasObjectId=2, SSB of neighboring cell}; and gapConfig does not carry ActiveDynamically. In this case, because inter-frequency measurement always requires an MG, gapConfig does not carry activeDynamically, suggesting that the MG is always active.

In another example, in the case shown in FIG. 6, if the terminal device has only one serving cell and the network device has also configured intra-frequency neighboring cell measurement, a frequency of an SSB in an intra-frequency neighboring cell being the same as that of SSB1, a measurement configuration may be as follows: {MeasObjectId=1, SSB1, [BWP0 BWP1]}, {MeasObjectId=1, SSB2, BWP2}, {MeasObjectId=1, SSB2, BWP3}, and {MeasObjectId=2, SSB1}; and activeDynamically=true in gapConfig. In this case, if an active BWP of a serving cell is switched to BWP0 or BWP1, a dynamic MO including a frequency of SSB1 is active. However, because an MO with MeasObjectID=2 is also configured with a frequency of SSB1, MeasObjectID=2 is active, and MeasObjectID=1 is inactive.

In another optional embodiment, the second information is received through serving cell configuration information. In this case, the serving cell configuration information may further include third information, and the third information is used for indicating identities of the plurality of MOs of the first serving cell.

In an example, the second information may be included in a BWP configuration in the serving cell configuration information, and the third information may be included in a serving cell configuration.

For example, a possible configuration may be as follows:

```
BWP-Downlink ::= SEQUENCE {
bwp-Id                              BWP-Id,
bwp-Common                          BWP-DownlinkCommon OPTIONAL,
-- Cond SetupOtherBWP
bwp-DedicatedBWP-DownlinkDedicated                          OPTIONAL,
-- Cond SetupOtherBWP
measObjectDynamicMeasObjectNR                               OPTIONAL
...
}
ServingCellConfig ::= SEQUENCE {
MeasObjectId ::=   INTEGER (1..maxNrofObjectId) OPTIONAL
}.
```

A measObjectDynamic (that is, the second information) information element is added to a BWP downlink configuration BWP-Downlink in the serving cell configuration information, and is used for configuring a dynamic MO associated with each BWP. In the serving cell configuration, ServingCellConfig, a field MeasObjectId (that is, the third information) is added to indicate MeasObjectId corresponding to dynamic MOs of one serving cell (that is, the first serving cell). Dynamic MOs of one serving cell use one common MeasObjectId.

For another example, another possible configuration may be as follows:

```
BWP-Downlink ::= SEQUENCE {
bwp-Id                              BWP-Id,
bwp-Common                          BWP-DownlinkCommon OPTIONAL, -- Cond
SetupOtherBWP
bwp-DedicatedBWP-DownlinkDedicated    OPTIONAL, -- Cond SetupOtherBWP
measObjectDynamicId INTEGER (1..maxNrofBWPs) OPTIONAL
}
ServingCellConfig ::= SEQUENCE {
MeasObjectId                        INTEGER (1..maxNrofObjectId) OPTIONAL
measObjectDynamicList SEQUENCE (SIZE (1.. maxNrofBWPs)) OF
MeasObjectNR                        OPTIONAL
}.
```

A dynamic MO list measObjectDynamicList and MeasObjectId (that is, the third information) corresponding to dynamic MOs are configured in the serving cell configuration, ServingCellConfig. A field measObjectDynamicId is added to the BWP downlink configuration BWP-Downlink in the serving cell configuration information, indicating which dynamic MO (that is, the second information) in measObjectDynamicList is associated with the BWP.

With the measurement configuration method provided in the embodiments of this application, if the terminal device switches to a BWP that does not include a frequency of an SSB that is indicated by an MO corresponding to a to-be-measured serving cell, the MG in the measurement configuration information is activated accordingly, with no need of configuration through RRC signaling, so as to resolve a problem of measurement configuration mismatch in a dynamic BWP switching process and reduce RRC signaling.

Figure 7:
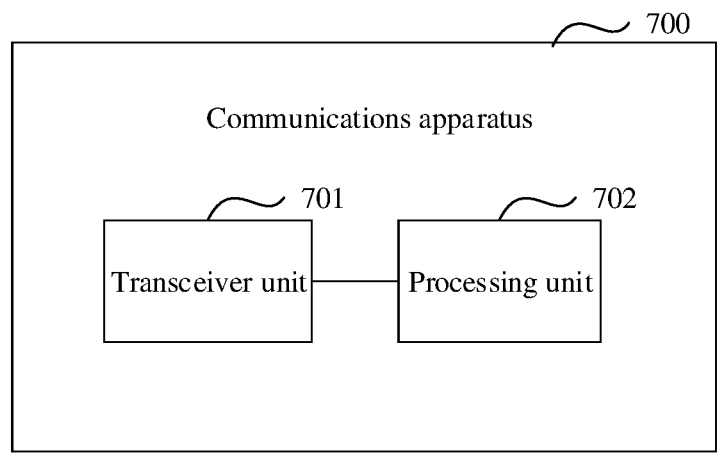
FIG. 7 is a schematic structural diagram of a communications apparatus according to this application.

Based on the foregoing embodiments, an embodiment of this application further provides a communications apparatus. Referring to FIG. 7, the communications apparatus 700 may include a transceiver unit 701 and a processing unit 702. The transceiver unit 701 is configured for the communications apparatus 700 to receive information (messages or data) or transmit information (messages or data), and the processing unit 702 is configured to control and manage actions of the communications apparatus 700. The processing unit 702 may further control the steps executed by the transceiver unit 701.

For example, the communications apparatus 700 may be the terminal device in the foregoing embodiments, and specifically may be a processor, a chip or system on chip, a functional module, or the like in the terminal device; or the communications apparatus 700 may be the network device in the foregoing embodiments, and specifically may be a processor, a chip or system on chip, a functional module, or the like in the network device.

In an embodiment, if the communications apparatus 700 is configured to implement the functions of the terminal device in the embodiment shown in FIG. 3, specifically, the transceiver unit 701 is configured to receive measurement configuration information from a network device, where the measurement configuration information includes first information, the first information is used for indicating that a measurement gap MG is active if a frequency of a synchronization signal/physical broadcast channel block SSB that is indicated by a measurement object MO of a first serving cell of the terminal device is out of a currently active bandwidth part BWP of the first serving cell, and the first serving cell is any one of at least one serving cell of the terminal device; and after the active BWP of the first serving cell is switched from a first BWP to a second BWP, the processing unit 702 is configured to determine, based on the first information, that the MG in the measurement configuration is active, where the second BWP does not include the frequency of the SSB that is indicated by the MO corresponding to the first serving cell.

In an optional embodiment, after the active BWP of the first serving cell is switched from the first BWP to a third BWP, the processing unit 702 may be further configured to determine, based on the first information, that the MG in the measurement configuration is inactive, where the third BWP includes the frequency of the SSB that is indicated by the MO corresponding to the first serving cell. For example, the first information may be located in a first field in a gap configuration of the measurement configuration information.

In an optional embodiment, if the network device has configured a plurality of serving cells for the terminal device, a same MG is active if a frequency of an SSB that is indicated by an MO corresponding to any one of the plurality of serving cells is out of a currently active BWP of the serving cell.

In an optional embodiment, the transceiver unit 701 may be further configured to receive second information from the network device, where the second information is used for indicating a correspondence between BWPs and MOs of the first serving cell of the terminal device, the first serving cell is configured with a plurality of MOs, and any one of the MOs is configured with a frequency of one SSB; and the processing unit 702 is further configured to determine, based on the correspondence between BWPs and MOs, a first MO corresponding to a fourth BWP, where the fourth BWP is the currently active BWP of the first serving cell of the terminal device, and the fourth BWP is different from the second BWP; and perform measurement on the SSB based on a frequency of an SSB that is indicated by the first MO.

For example, the second information may be received through the measurement configuration information; or the second information may be received through serving cell configuration information. Specifically, if the second information is received through the measurement configuration information, the second information may be included in a configuration of each of the MOs in the measurement configuration information, and the correspondence between BWPs and MOs of the first serving cell that is indicated by the second information in a configuration of any one of the MOs is that the any one of the MOs corresponds to a BWP of the first serving cell. If the second information is received through the serving cell configuration information, the serving cell configuration information further includes third information, and the third information is used for indicating identities of the plurality of MOs of the first serving cell.

For example, MOs corresponding to different BWPs of the first serving cell have a same identity, and one of the plurality of MOs of the first serving cell is active at one moment.

In another embodiment, if the communications apparatus 700 is configured to implement the functions of the network device in the embodiment described in FIG. 3, specifically, the processing unit 702 is configured to determine measurement configuration information, where the measurement configuration information includes first information, the first information is used for indicating that a measurement gap MG is active if a frequency of a synchronization signal/physical broadcast channel block SSB that is indicated by a measurement object MO of a first serving cell of the terminal device is out of a currently active bandwidth part BWP of the first serving cell, and the first serving cell is any one of at least one serving cell of the terminal device; and the transceiver unit 701 is configured to transmit the measurement configuration information to the terminal device.

For example, the first information may be located in a first field in a gap configuration of the measurement configuration information.

In an optional embodiment, if the network device has configured a plurality of serving cells for the terminal device, a same MG is active if a frequency of an SSB that is indicated by an MO corresponding to any one of the plurality of serving cells is out of a currently active BWP of the serving cell.

In a specific embodiment, the processing unit 702 may be further configured to determine second information, where the second information is used for indicating a correspondence between BWPs and MOs of the first serving cell of the terminal device, the first serving cell is configured with a plurality of MOs, and any one of the MOs is configured with a frequency of one SSB; and the transceiver unit 701 is further configured to transmit the second information to the terminal device.

For example, the second information may be transmitted through the measurement configuration information; or the second information may be transmitted through serving cell configuration information. If the second information is transmitted through the measurement configuration information, the second information may be included in a configuration of each of the MOs in the measurement configuration information, and the correspondence between BWPs and MOs of the first serving cell that is indicated by the second information in a configuration of any one of the MOs is that the any one of the MOs corresponds to a BWP of the first serving cell. If the second information is transmitted through the serving cell configuration information, the serving cell configuration information may further include third information, and the third information is used for indicating identities of the plurality of MOs of the first serving cell.

Specifically, MOs corresponding to different BWPs of the first serving cell have a same identity, and one of the plurality of MOs of the first serving cell is active at one moment.

It should be noted that, division of units in this embodiment of this application is merely an example, and is only division of logical functions. Another division manner may be available in actual implementation. Functional units in this embodiment of this application may be integrated into one processing unit, or each of the units may exist alone physically, or two or more units may be integrated into one unit. The integrated unit may be implemented in a form of hardware, or may be implemented in a form of a software functional unit.

If the integrated unit is implemented in the form of a software functional unit and sold or used as a separate product, the integrated unit may be stored in a computer readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 8:
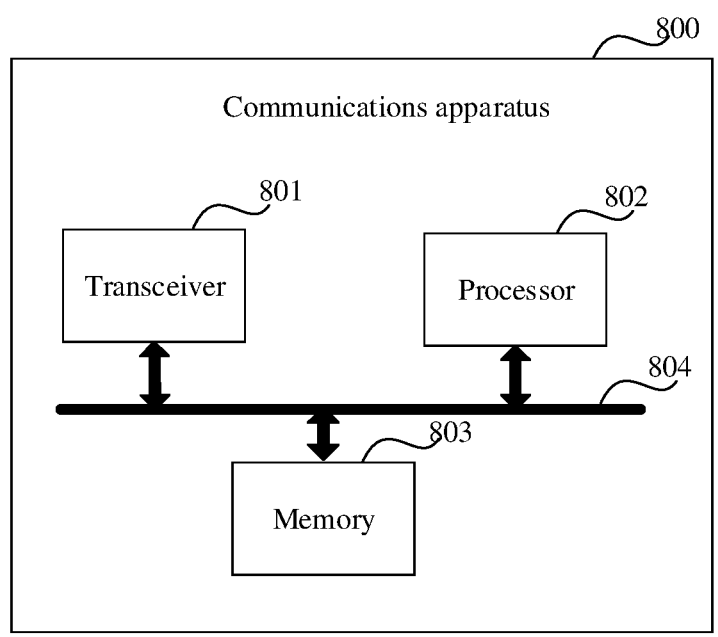
FIG. 8 is a structural diagram of a communications apparatus according to this application.

Based on the foregoing embodiments, an embodiment of this application further provides a communications apparatus. Referring to FIG. 8, the communications apparatus 800 may include a transceiver 801 and a processor 802. Optionally, the communications apparatus 800 may further include a memory 803. The memory 803 may be provided inside the communications apparatus 800 or outside the communications apparatus 800. The processor 802 may control the transceiver 801 to receive and transmit data.

Specifically, the processor 802 may be a central processing unit (CPU), a network processor (NP), or a combination of a CPU and an NP. The processor 802 may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), a generic array logic (GAL), or any combination thereof.

The transceiver 801, the processor 802, and the memory 803 are connected to each other. Optionally, the transceiver 801, the processor 802, and the memory 803 are connected to each other through a bus 804. The bus 804 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 8, but this does not mean that there is only one bus or only one type of bus.

In an optional embodiment, the memory 803 is configured to store a program and the like. Specifically, the program may include program code, and the program code includes a computer operation instruction. The memory 803 may include a RAM, and may further include a non-volatile memory (non-volatile memory), for example, one or more disk memories. The processor 802 executes an application program stored in the memory 803 to implement the foregoing functions, thereby implementing the functions of the communications apparatus 800.

For example, the communications apparatus 800 may be the terminal device in the foregoing embodiments, or may be the network device in the foregoing embodiments.

In an embodiment, if the communications apparatus 800 is configured to implement the functions of the terminal device in the embodiment shown in FIG. 3, the transceiver 801 is configured to receive measurement configuration information from a network device, where the measurement configuration information includes first information, the first information is used for indicating that a measurement gap MG is active if a frequency of a synchronization signal/physical broadcast channel block SSB that is indicated by a measurement object MO of a first serving cell of the terminal device is out of a currently active bandwidth part BWP of the first serving cell, and the first serving cell is any one of at least one serving cell of the terminal device; and after the active BWP of the first serving cell is switched from a first BWP to a second BWP, the processor 802 is configured to determine, based on the first information, that the MG in the measurement configuration is active, where the second BWP does not include the frequency of the SSB that is indicated by the MO corresponding to the first serving cell.

In an optional embodiment, after the active BWP of the first serving cell is switched from the first BWP to a third BWP, the processor 802 may be further configured to determine, based on the first information, that the MG in the measurement configuration is inactive, where the third BWP includes the frequency of the SSB that is indicated by the MO corresponding to the first serving cell.

For example, the first information may be located in a first field in a gap configuration of the measurement configuration information.

In an optional embodiment, if the network device has configured a plurality of serving cells for the terminal device, a same MG is active if a frequency of an SSB that is indicated by an MO corresponding to any one of the plurality of serving cells is out of a currently active BWP of the serving cell.

In an optional embodiment, the transceiver 801 may be further configured to receive second information from the network device, where the second information is used for indicating a correspondence between BWPs and MOs of the first serving cell of the terminal device, the first serving cell is configured with a plurality of MOs, and any one of the MOs is configured with a frequency of one SSB; and the processor 802 is further configured to determine, based on the correspondence between BWPs and MOs, a first MO corresponding to a fourth BWP, where the fourth BWP is the currently active BWP of the first serving cell of the terminal device, and the fourth BWP is different from the second BWP; and perform measurement on the SSB based on a frequency of an SSB that is indicated by the first MO.

For example, the second information may be received through the measurement configuration information; or the second information may be received through serving cell configuration information. Specifically, if the second information is received through the measurement configuration information, the second information may be included in a configuration of each of the MOs in the measurement configuration information, and the correspondence between BWPs and MOs of the first serving cell that is indicated by the second information in a configuration of any one of the MOs is that the any one of the MOs corresponds to a BWP of the first serving cell. If the second information is received through the serving cell configuration information, the serving cell configuration information may further include third information, and the third information is used for indicating identities of the plurality of MOs of the first serving cell.

For example, MOs corresponding to different BWPs of the first serving cell have a same identity, and one of the plurality of MOs of the first serving cell is active at one moment.

In another embodiment, if the communications apparatus 800 is configured to implement the functions of the network device in the embodiment described in FIG. 3, specifically, the processor 802 is configured to determine measurement configuration information, where the measurement configuration information includes first information, the first information is used for indicating that a measurement gap MG is active if a frequency of a synchronization signal/physical broadcast channel block SSB that is indicated by a measurement object MO of a first serving cell of the terminal device is out of a currently active bandwidth part BWP of the first serving cell, and the first serving cell is any one of at least one serving cell of the terminal device; and the transceiver 801 is configured to transmit the measurement configuration information to the terminal device.

For example, the first information may be located in a first field in a gap configuration of the measurement configuration information.

In an optional embodiment, if the network device has configured a plurality of serving cells for the terminal device, a same MG is active if a frequency of an SSB that is indicated by an MO corresponding to any one of the plurality of serving cells is out of a currently active BWP of the serving cell.

In a specific embodiment, the processor 802 may be further configured to determine second information, where the second information is used for indicating a correspondence between BWPs and MOs of the first serving cell of the terminal device, the first serving cell is configured with a plurality of MOs, and any one of the MOs is configured with a frequency of one SSB; and the transceiver 801 is further configured to transmit the second information to the terminal device.

For example, the second information may be transmitted through the measurement configuration information; or the second information may be transmitted through serving cell configuration information. If the second information is transmitted through the measurement configuration information, the second information may be included in a configuration of each of the MOs in the measurement configuration information, and the correspondence between BWPs and MOs of the first serving cell that is indicated by the second information in a configuration of any one of the MOs is that the any one of the MOs corresponds to a BWP of the first serving cell. If the second information is transmitted through the serving cell configuration information, the serving cell configuration information may further include third information, and the third information is used for indicating identities of the plurality of MOs of the first serving cell.

Specifically, MOs corresponding to different BWPs of the first serving cell have a same identity, and one of the plurality of MOs of the first serving cell is active at one moment.

Based on the foregoing embodiments, an embodiment of this application further provides a communications system, where the communications system may include the terminal device, network device, and the like in the foregoing embodiments.

An embodiment of this application further provides a computer readable storage medium, where the computer readable storage medium is configured to store a computer program, and when the computer program is executed by a computer, the computer can implement any measurement configuration method provided in the foregoing method embodiments.

An embodiment of this application further provides a computer program product, where the computer program product is configured to store a computer program, and when the computer program is executed by a computer, the computer can implement any measurement configuration method provided in the foregoing method embodiments.

An embodiment of this application further provides a chip, including a processor and a communications interface, where the processor is coupled to a memory, and is configured to invoke a program in the memory to cause the chip to implement any measurement configuration method provided in the foregoing method embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to disk memories, CD-ROMs, optical memories, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the protection scope of this application. This application is intended to cover these modifications and variations provided that they fall within the scope of protection defined by the following claims and their equivalent technologies of this application.

What is claimed is:

1. A measurement configuration method, comprising:
receiving, by a terminal device, measurement configuration information from a network device, wherein the measurement configuration information comprises a measurement gap (MG) and first information, the first information indicates that the MG is active when a frequency of a synchronization signal/physical broadcast channel block (SSB) that is indicated by a measurement object (MO) of a first serving cell of the terminal device is out of a currently active bandwidth part (BWP) of the first serving cell, and the first serving cell is any one of at least one serving cell of the terminal device; and
after an active BWP of the first serving cell of the terminal device is switched from a first BWP to a second BWP, determining, by the terminal device based on the first information, that the MG in the measurement configuration is active, wherein the second BWP does not comprise the frequency of the SSB that is indicated by the MO corresponding to the first serving cell; and
wherein when the network device has configured a plurality of serving cells for the terminal device, for each of the plurality of serving cells, the same MG is active when a frequency of an SSB that is indicated by an MO corresponding to the respective serving cell is out of a currently active BWP of the serving cell, and the same MG is not active when the frequency of the SSB that is indicated by the MO corresponding to the respective serving cell is not out of the currently active BWP of the serving cell.

2. The method according to claim 1, further comprising:
after an active BWP of the first serving cell of the terminal device is switched from the first BWP to a third BWP, determining, by the terminal device based on the first information, that the MG in the measurement configuration is inactive, wherein the third BWP comprises the frequency of the SSB that is indicated by the MO corresponding to the first serving cell, and the third BWP is a different BWP than the second BWP.

3. The method according to claim 1, wherein the first information is located in a first field in a gap configuration of the measurement configuration information, and the first information is set to true or false, wherein the first information being true indicates that the MG is active when the frequency of the SSB that is indicated by the MO of the first serving cell of the terminal device is out of the currently active BWP of the first serving cell.

4. The method according to claim 1, further comprising:
receiving, by the terminal device, second information from the network device, wherein the second information indicates a correspondence between BWPs and MOs of the first serving cell of the terminal device, the first serving cell is configured with a plurality of MOs, and each the MOs is configured with a frequency of one SSB;
determining, by the terminal device based on the correspondence between BWPs and MOs, a first MO corresponding to a fourth BWP, wherein the fourth BWP is a currently active BWP of the first serving cell of the terminal device, and the fourth BWP is different from the second BWP; and
performing, by the terminal device, measurement on an SSB based on a frequency of the SSB that is indicated by the first MO.

5. The method according to claim 4, wherein the second information is received through the measurement configuration information; or the second information is received through serving cell configuration information.

6. The method according to claim 5, wherein when the second information is received through the measurement configuration information, the second information is comprised in a configurations of the MOs in the measurement configuration information, and the correspondence between BWPs and MOs of the first serving cell that is indicated by the second information in a configuration of any one of the MOs is that the any one of the MOs corresponds to a corresponding BWP of the first serving cell.

7. The method according to claim 5, wherein when the second information is received through the serving cell configuration information, the serving cell configuration information further comprises third information, and the third information indicates identities of the plurality of MOs of the first serving cell.

8. The method according to claim 4, wherein MOs corresponding to different BWPs of the first serving cell have a same identity, and one of the plurality of MOs of the first serving cell is active at one moment.

9. A measurement configuration method, comprising:
determining, by a network device, measurement configuration information, wherein the measurement configuration information comprises a measurement gap (MG) and first information, the first information indicates that the MG is active when a frequency of a synchronization signal/physical broadcast channel block (SSB) that is indicated by a measurement object (MO) of a first serving cell of a terminal device is out of a currently active bandwidth part (BWP) of the first serving cell, and the first serving cell is any one of at least one serving cell of the terminal device; and
transmitting, by the network device, the measurement configuration information to the terminal device; and
wherein when the network device has configured a plurality of serving cells for the terminal device, for each of the plurality of serving cells, the same MG is active when a frequency of an SSB that is indicated by an MO corresponding to the respective serving cell is out of a currently active BWP of the serving cell, and the same MG is not active when the frequency of the SSB that is indicated by the MO corresponding to the respective serving cell is not out of the currently active BWP of the serving cell.

10. The method according to claim 9, wherein the first information is located in a first field in a gap configuration of the measurement configuration information, and the first information is set to true or false, wherein the first information being true indicates that the MG is active when the frequency of the SSB that is indicated by the MO of the first serving cell of the terminal device is out of the currently active BWP of the first serving cell.

11. The method according to claim 9, further comprising:
determining, by the network device, second information, wherein the second information indicates a correspondence between BWPs and MOs of the first serving cell of the terminal device, the first serving cell is configured with a plurality of MOs, and each of the MOs is configured with a frequency of one SSB; and
transmitting, by the network device, the second information to the terminal device.

12. The method according to claim 11, wherein the second information is transmitted through the measurement configuration information; or the second information is transmitted through serving cell configuration information.

13. The method according to claim 12, wherein when the second information is transmitted through the measurement configuration information, the second information is comprised in a configurations of the MOs in the measurement configuration information, and the correspondence between BWPs and MOs of the first serving cell that is indicated by the second information in a configuration of any one of the MOs is that the any one of the MOs corresponds to a corresponding BWP of the first serving cell.

14. The method according to claim 12, wherein when the second information is transmitted through the serving cell configuration information, the serving cell configuration information further comprises third information, and the third information indicates identities of the plurality of MOs of the first serving cell.

15. The method according to claim 11, wherein MOs corresponding to different BWPs of the first serving cell have a same identity, and one of the plurality of MOs of the first serving cell is active at one moment.

16. A terminal device, comprising at least one processor and a transceiver, wherein
the transceiver is configured to receive and transmit data; and
the at least one processor is coupled to a memory and configured to invoke a program in the memory to cause the terminal device to execute operations comprising:
receiving measurement configuration information from a network device, wherein the measurement configuration information comprises a measurement gap (MG) and first information, the first information indicates that the MG is active when a frequency of a synchronization signal/physical broadcast channel block (SSB) that is indicated by a measurement object (MO) of a first serving cell of the terminal device is out of a currently active bandwidth part (BWP) of the first serving cell, and the first serving cell is any one of at least one serving cell of the terminal device; and after an active BWP of the first serving cell of the terminal device is switched from a first BWP to a second BWP, determining, based on the first information, that the MG in the measurement configuration is active, wherein the second BWP does not comprise the frequency of the SSB that is indicated by the MO corresponding to the first serving cell; and
wherein when the network device has configured a plurality of serving cells for the terminal device, for each of the plurality of serving cells, the same MG is active when a frequency of an SSB that is indicated by an MO corresponding to the respective serving cell is out of a currently active BWP of the serving cell, and the same MG is not active when the frequency of the SSB that is indicated by the MO corresponding to the respective serving cell is not out of the currently active BWP of the serving cell.

17. The terminal device according to claim 16, wherein the at least one processor is configured to further invoke the program in the memory to further cause the terminal device to execute operations comprising:
after an active BWP of the first serving cell of the terminal device is switched from the first BWP to a third BWP, determining, based on the first information, that the MG in the measurement configuration is inactive, wherein the third BWP comprises the frequency of the SSB that is indicated by the MO corresponding to the first serving cell, and the third BWP is a different BWP than the second BWP.

18. The terminal device according to claim 16, wherein the first information is located in a first field in a gap configuration of the measurement configuration information, and the first information is set to true or false, wherein the first information being true indicates that the MG is active when the frequency of the SSB that is indicated by the MO of the first serving cell of the terminal device is out of the currently active BWP of the first serving cell.

19. The terminal device according to claim 16, wherein the at least one processor is configured to further invoke the program in the memory to further cause the terminal device to execute operations comprising:
receiving second information from the network device, wherein the second information indicates a correspondence between BWPs and MOs of the first serving cell of the terminal device, the first serving cell is configured with a plurality of MOs, and each the MOs is configured with a frequency of one SSB;
determining, based on the correspondence between BWPs and MOs, a first MO corresponding to a fourth BWP, wherein the fourth BWP is a currently active BWP of the first serving cell of the terminal device, and the fourth BWP is different from the second BWP; and
performing measurement on an SSB based on a frequency of the SSB that is indicated by the first MO.

* * * * *